UNITED STATES PATENT OFFICE.

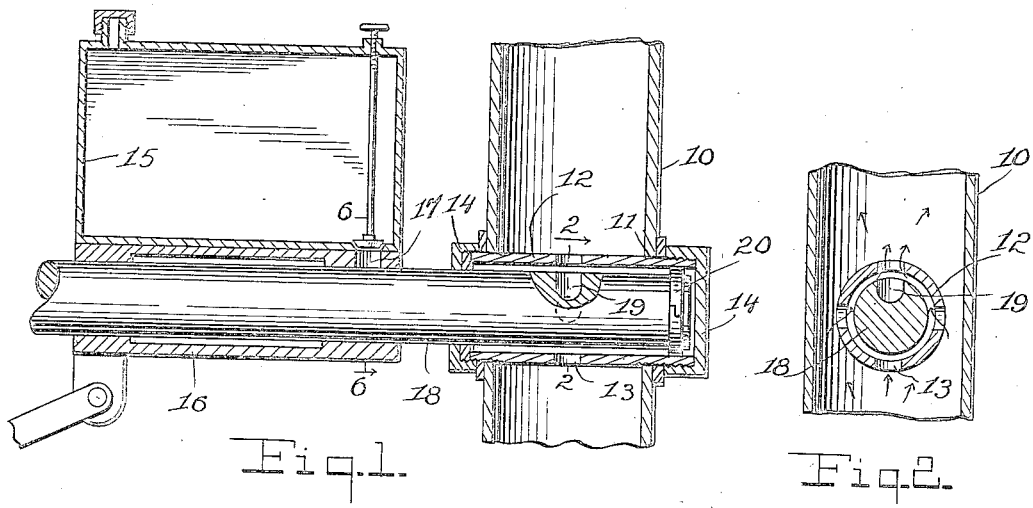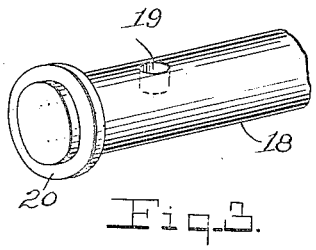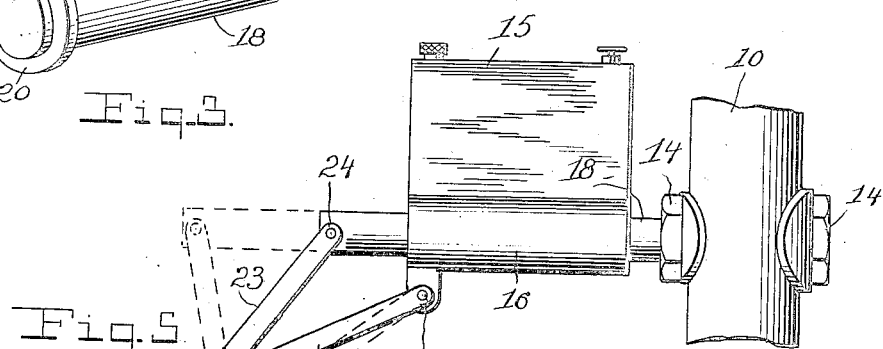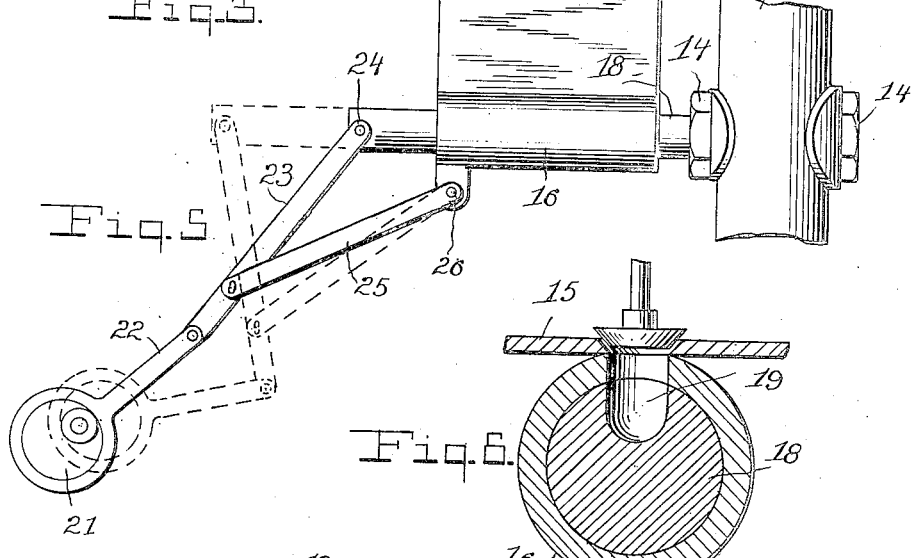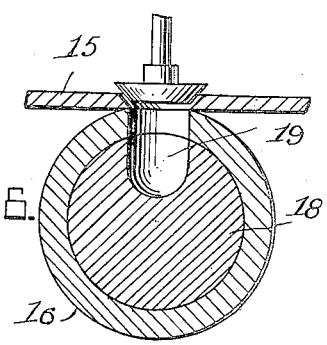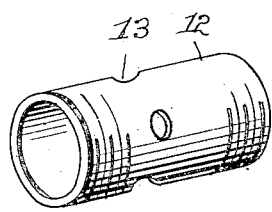

ROBERT ROBINSON, OF ROBERTS, MONTANA.

LUBRICATOR.

1,056,371. Specification of Letters Patent. Patented Mar. 18, 1913.

Application filed September 19, 1912. Serial No. 721,260.

*To all whom it may concern:*

Be it known that I, ROBERT ROBINSON, a citizen of the United States, residing at Roberts, in the county of Carbon, State of Montana, have invented certain new and useful Improvements in Lubricators; and I do hereby declare the following to be a full, clear, and exact description of the invention, such as will enable others skilled in the art to which it appertains to make and use the same.

This invention relates to lubricators, and has for an object to provide a novel lubricator adapted to carry a predetermined quantity of the lubricant into the steam or other agent and facilitate the lubricant being thoroughly atomized and diffused through said steam or other agent.

With the above object in view, the invention consists of certain novel details of construction and combination of parts hereinafter fully described and claimed, it being understood that various modifications may be made in the minor details of construction within the scope of the appended claims.

In the accompanying drawing forming part of this specification:—Figure 1 is a longitudinal sectional view through the device applied to a steam pipe. Fig. 2 is a vertical sectional view taken on the line 2—2 Fig. 1. Fig. 3 is a detail perspective view of the reciprocating lubricant carrying rod. Fig. 4 is a detail perspective view of the orificed tube carried by the steam pipe. Fig. 5 is a side elevation of the device. Fig. 6 is a fragmentary vertical sectional view taken on the line 6—6 Fig. 1.

Referring now to the drawings in which like characters of reference designate similar parts, 10 designates a steam pipe having alined threaded openings 11 which receive a short exteriorly threaded tube 12 that projects across the bore of the pipe and is provided with a circumferential series of openings 13. Stuffing boxes 14 are threaded upon the ends of the tube and bear against the outer wall of the steam pipe.

A stationary lubricant tank 15 is disposed to one side of the steam pipe and is provided on the bottom with a pipe 16 which is open at both ends and communicates with the tank through an opening 17, this pipe being substantially of the same diameter as the tube 12.

A rod 18 is slidably fitted in the pipe 16 and tube 12 and is provided with a recess 19 which is adapted to alternately register with the lubricant inlet opening 17 of the pipe and the lubricant outlet opening of the series 13 which is in alinement with the inlet opening 17. The rod is of smaller diameter than the pipe 16 and tube 12 and is provided on one side of the recess 19 with a packing ring 20 which fills in the space existing between the rod and inner wall of the pipe and tube.

The lubricant carried into the tube by the recess 19 of the rod is exposed to the heat and pressure of the steam entering the series of openings 13 in the tube with a resultant thorough atomizing and diffusion of the lubricant through the steam, the steam charged with this lubricant being then carried through the steam pipe to the surface requiring lubrication.

For reciprocating the rod 18, an eccentric 21 is operatively connected to a suitable rotating part of the engine and is provided with an eccentric rod 22 which is pivotally connected to one end of a rock link 23, the latter being pivotally connected terminally to the end of the rod 12 as shown in Fig. 4. A bracket arm 25 is hingedly connected at one end to the pipe 16 as shown at 26 and is connected at the opposite end to the rock link 23 by means of a pin 27 passed through the bracket arm and through the rock link.

What is claimed is:—

1. In a lubricator, a tank, a pipe open at both ends and having communication with said tank, a reciprocating rod in said pipe having a lubricant recess, an engine steam supply pipe, a tube projecting across the bore of said pipe and having a circumferential series of openings, said tube being of greater diameter than and receiving said rod, a packing ring on said rod filling in the space between said tube and said rod, and means for reciprocating said rod whereby to move said recess alternately into registration with the interior of said tank and one of said series of openings in said tube.

2. In a lubricator, a tank, an engine steam supply pipe, a tube projecting across the bore of said pipe and having a plurality of openings communicating with said bore, a rod of less diameter than and slidably fitting within said tube, a packing ring on said rod snugly fitting in said tube, said rod being formed with a lubricant receiving recess adapted to alternately register with the interior of said tank and with one of said openings, a bracket arm hinged to said tank, a rock link pivotally connected to said rod and fulcrumed on said bracket arm, and means for actuating said rock link.

In testimony whereof, I affix my signature, in presence of two witnesses.

ROBERT ROBINSON.

Witnesses:
 F. W. LYLE,
 F. H. ALDEN,